United States Patent [19]
Allen

[11] Patent Number: 5,566,789
[45] Date of Patent: Oct. 22, 1996

[54] BICYCLE ANTI-LOCKING BRAKE

[76] Inventor: William B. Allen, 10412 SW. 145th Ct., Miami, Fla. 33186

[21] Appl. No.: 498,937

[22] Filed: Jul. 6, 1995

[51] Int. Cl.$^6$ ....................................... B62L 5/20
[52] U.S. Cl. ................... 188/24.15; 188/24.22; 188/2 D
[58] Field of Search .................. 188/2 D, 24.11, 188/24.12, 24.15, 24.19, 24.22

[56] References Cited

U.S. PATENT DOCUMENTS

| | | | |
|---|---|---|---|
| 4,305,482 | 12/1981 | Arai | 188/2 D X |
| 4,351,418 | 9/1982 | Woodring et al. | 188/2 D X |
| 5,425,434 | 7/1995 | Romano | 188/24.19 |

FOREIGN PATENT DOCUMENTS

| | | | |
|---|---|---|---|
| 577365 | 9/1924 | France | 188/24.12 |
| 426648 | 9/1948 | Italy | 188/24.12 |

Primary Examiner—Robert J. Oberleitner
Assistant Examiner—Peter M. Poon
Attorney, Agent, or Firm—J. Sanchelima

[57] ABSTRACT

An improvement for brake systems that use a Bowden cable mechanism whereby the actuating force applied by a user is opposed and limited to a predetermined magnitude to avoid locking the rim of the wheel. The improvement includes the use of a spring member between the sheating and the adjusting nut. The spring can be either linear or non-linear. The action applied by a user to a brake system and transmitted to a brake caliper.

4 Claims, 1 Drawing Sheet

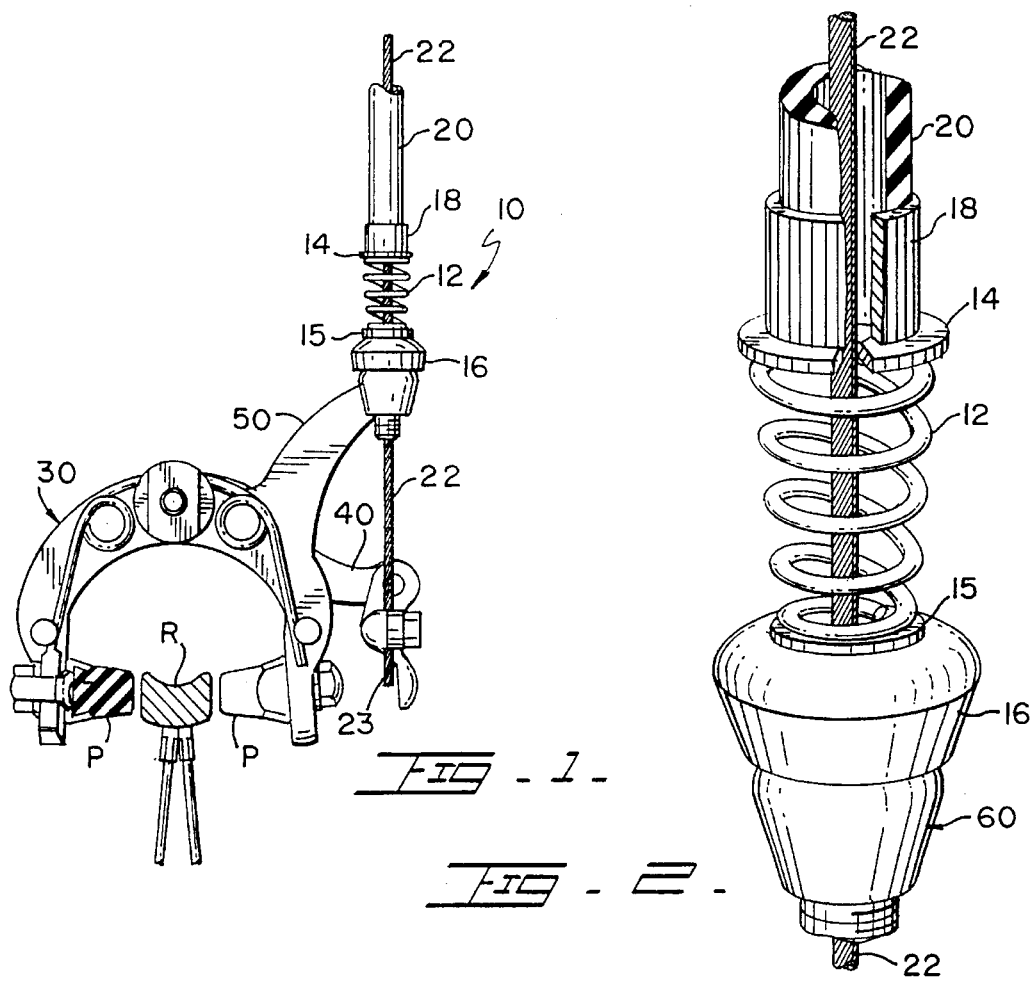
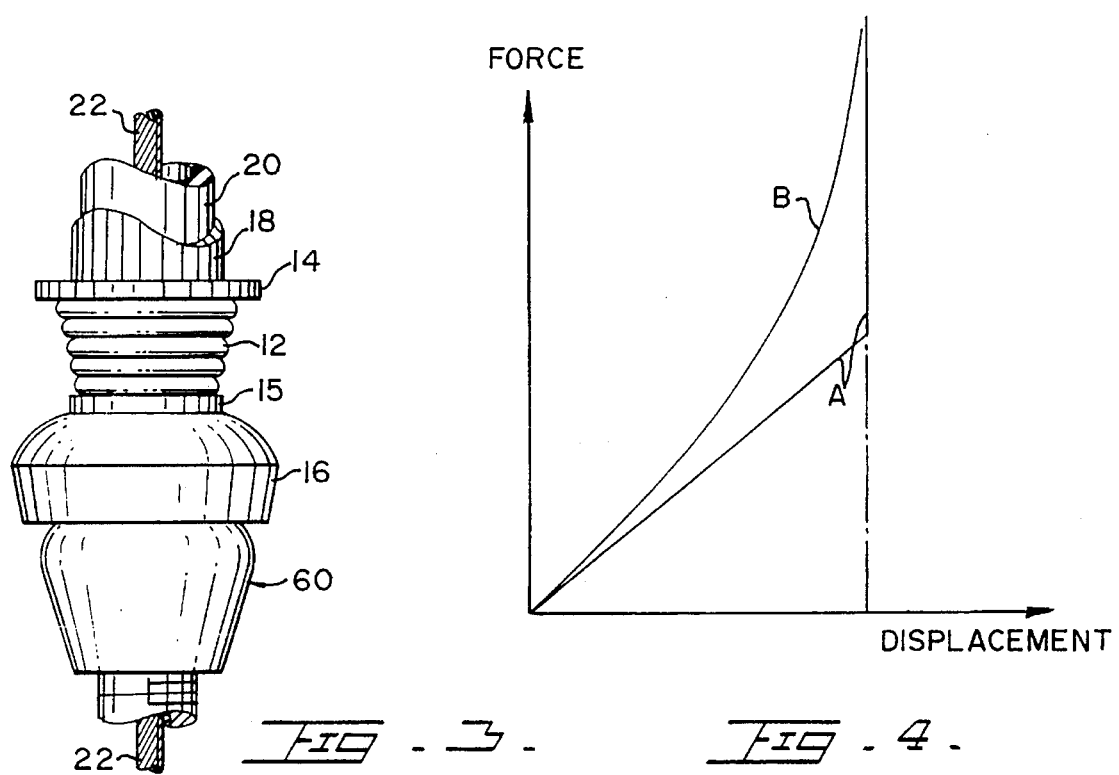

BICYCLE ANTI-LOCKING BRAKE

BACKGROUND OF THE INVENTION

1. Field of the Invention

The present invention relates to anti-locking brake mechanisms.

2. Description of the Related Art.

One type of brake assembly generally used in bicycles includes the use of a pair of calipers with brake pads that are brought in contact with the bicycle rim. A user actuates a lever cooperatively positioned on the handle bar and the force applied is transmitted by a Bowden cable device. The Bowden cable device includes an outer sheathing and an inner slidable brake cable. The outer sheathing is anchored at one end of the lever bracket and the other end to the cap member. One end of the brake cable is connected to the lever while the other end is connected to the calipers for the transmission of the movement of the cable, as a result of the user's gripping force on the lever. Sometimes a user panics and applies an excessive force on the lever. This is specially dangerous when this excessive force is applied to the brake mechanism mounted on the front wheel. If the front wheel locks, not infrequently the user's inertia throws him or her over the front wheel. To avoid this, the present invention provides for a simple anti-lock mechanism that prevents a user from applying more than a predetermined force.

SUMMARY OF THE INVENTION

It is one of the main objects of the present invention to provide a brake mechanism to prevent a user from applying an excessive dangerous gripping force to the bicycle's brake handle.

It is another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an elevational front view of a bicycle caliper brake mechanism using the present invention.

FIG. 2 shows a partial elevational tilted view of the present invention having a spring in release position.

FIG. 3 represents a partial elevational view of the embodiment shown in the previous figure having the spring in constrain position.

FIG. 4 is a graphic representation of the relationship between the force applied and the displacement of a brake cable, which is proportional to the movements of pads P towards rim R, using springs with two different compression charateristics.

DETAILED DESCRIPTION OF THE PREFERRED EMBODIMENT

Referring now to the drawings, where the present invention is generally referred to with numeral 10, it can be observed that it basically includes spring member 12 coaxially mounted over cable 22 between washer member 14 and washer member 15. Washer member 14 is mounted against cap member 18 to which outer tubular casing or sheathing 20 is anchored. Member 15 is mounted against guiding cable assembly 60, which is rigidly mounted to cable 22 at a predetermined point. In FIG. 1, a side pull brake system is illustrated but the present invention can also be incorporated with center pull and center lever brake systems.

In operation, when a user applies a gripping force on the bicycle's braker lever (not shown), end 23 of cable 22 is pulled towards sheathing 20. This causes calipers 40 and 50 to pivotally move bringing pads P in contact with rim R. Spring member 12, however, offers resistance to the force transmitted to cable 22 and this resistance depends on the characteristics of spring member 12.

Adjusting nut 16 includes a threaded pin on one end with a longitudinal opening through which cable 22 freely passes. Nut 16 is screwed through a portion of caliper 50 and depending on how far it is driven the tension will be adjusted.

The relationship between the force applied and the displacement of cable 22, which is proportional to the movements of pads P towards rim R, is graphically represented in FIG. 4. Curves A and B represent non-linear and linear spring members characteristics. Curve A shows spring member 12 with linear compression characteristics over a predetermined displacement range and then the displacement abruptly ends when spring member 12 is completely compressed. Curve B represents a spring member 12 with non-linear compression characteristics that asymptotically approaches the point of total compression. Under either curve, no further displacement can be achieved after spring member 12 is totally compressed. In this manner, a user will be allowed to actuate the brake mechanism over a predetermined range and after a predetermined amount of safe braking force is applied, he or she will not be able to go beyond that limit.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In a bicycle having at least one wheel that includes a rim and at least one pivotally mounted brake caliper member that is actuated through a Bowden cable mechanism that includes a sheathing member that coaxially houses a cable member that passes through an adjusting nut that is mounted to said brake caliper member, the improvement comprising spring means coaxially disposed around said cable member between said sheathing member and said adjusting nut so that said spring means opposes the force applied by a user actuating said cable member, thereby permitting a user to readily adjust the tension of said spring means.

2. The improvement set forth in claim 1 further including a washer cap member positioned between said sheathing member and said spring means.

3. The improvement set forth in claim 2 wherein said spring means is non-linear so that the compression force increases proportionally with the force applied.

4. The improvement set forth in claim 3 wherein said spring means is designed and adapted to prevent a user from transmitting his or her actuating force to said brake caliper beyond a predetermined limit.

* * * * *